F. H. PIERPONT.
CUTTER HEAD MECHANISM FOR PUNCH CUTTING AND LIKE MACHINES.
APPLICATION FILED JUNE 16, 1908.
938,433.
Patented Oct. 26, 1909.
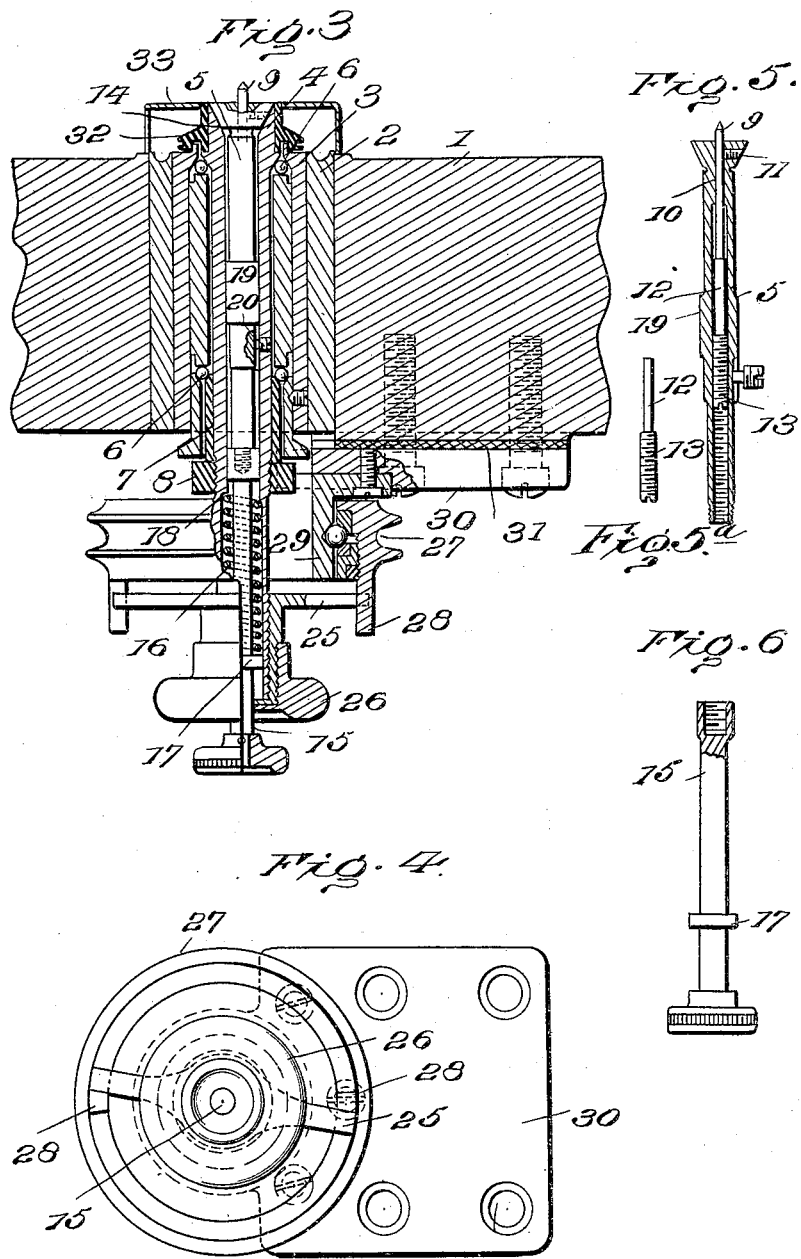

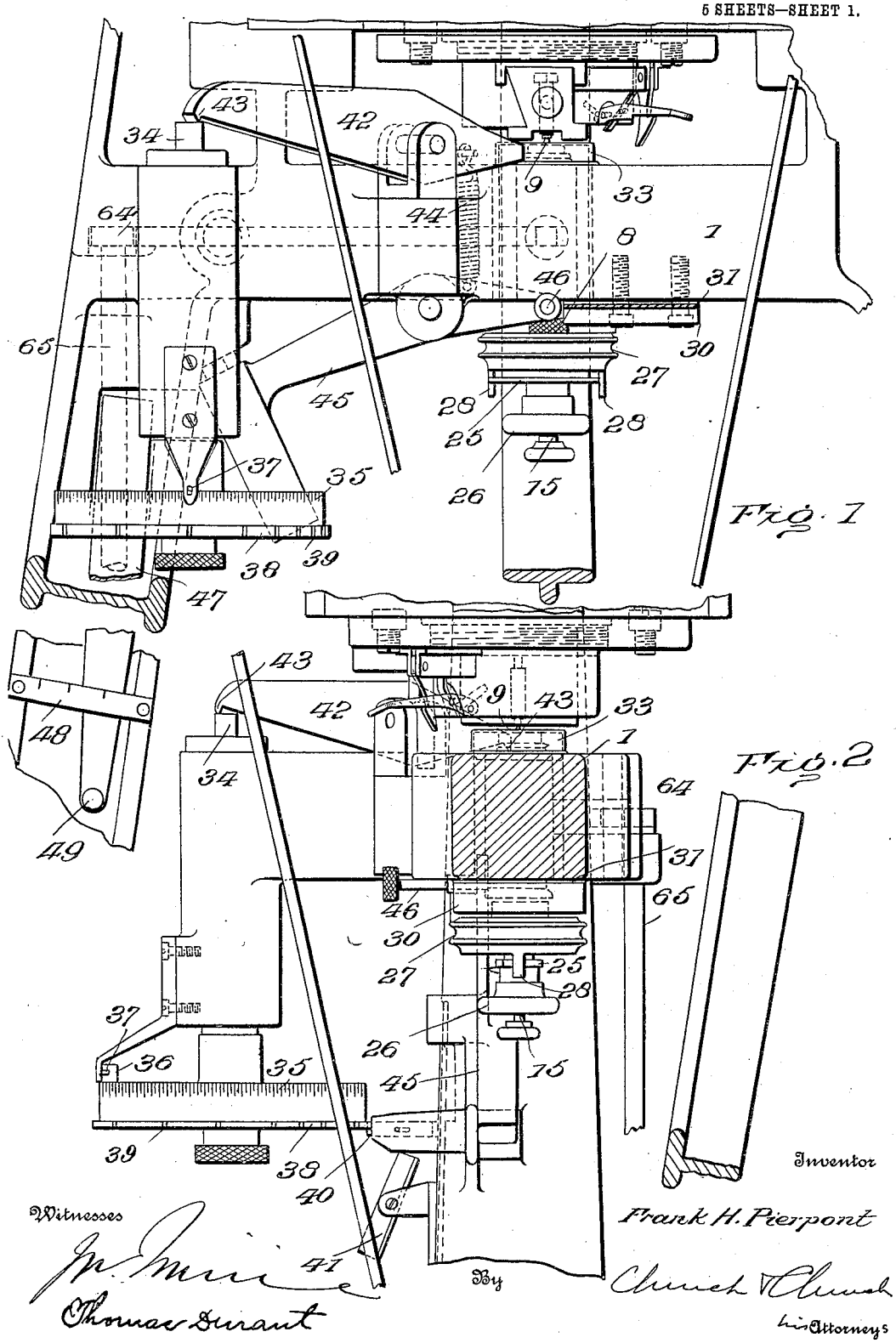

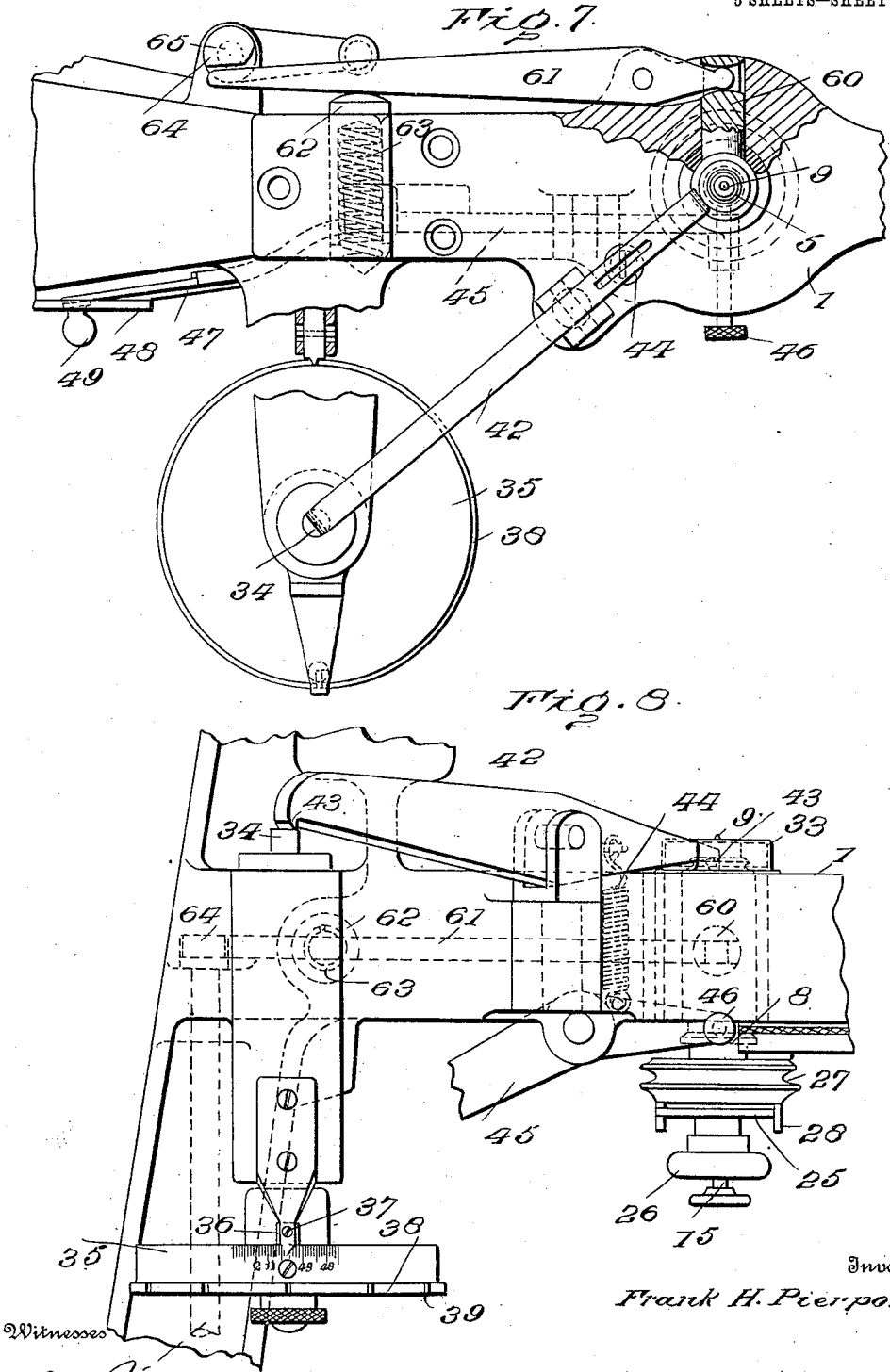

F. H. PIERPONT.
CUTTER HEAD MECHANISM FOR PUNCH CUTTING AND LIKE MACHINES.
APPLICATION FILED JUNE 16, 1908.
938,433.
Patented Oct. 26, 1909.
5 SHEETS—SHEET 4.
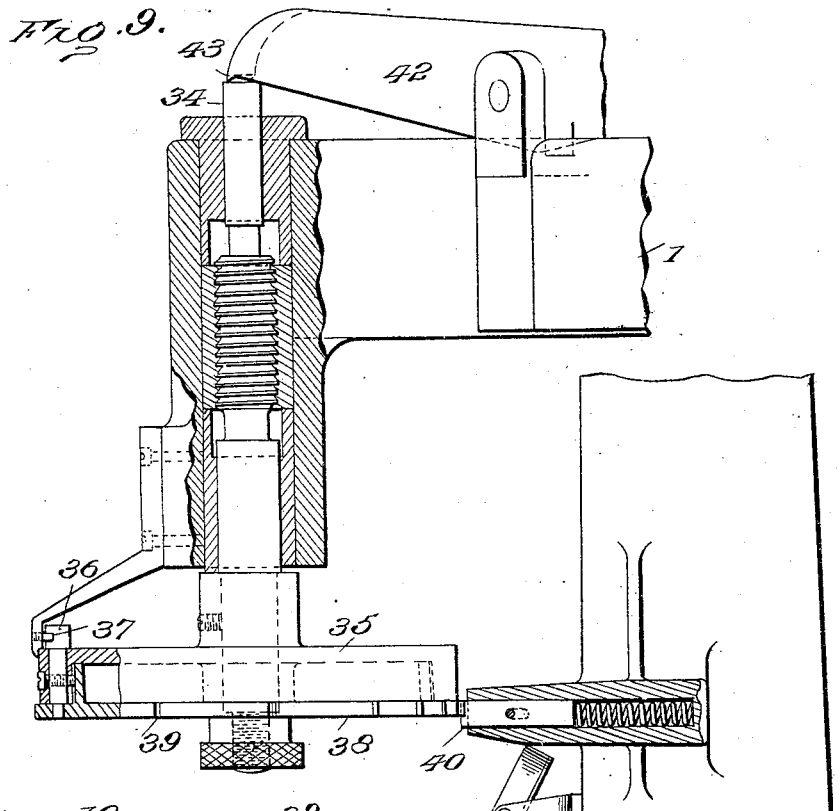
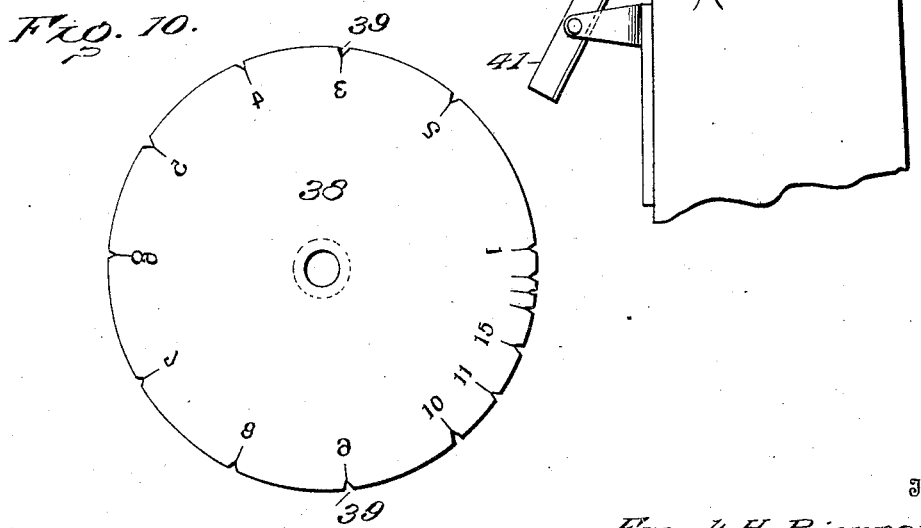
Witnesses
Thomas Durant
Inventor
Frank H. Pierpont
By Church & Church
his Attorneys F. H. PIERPONT.
CUTTER HEAD MECHANISM FOR PUNCH CUTTING AND LIKE MACHINES.
APPLICATION FILED JUNE 16, 1908.
938,433.
Patented Oct. 26, 1909.
5 SHEETS—SHEET 5.
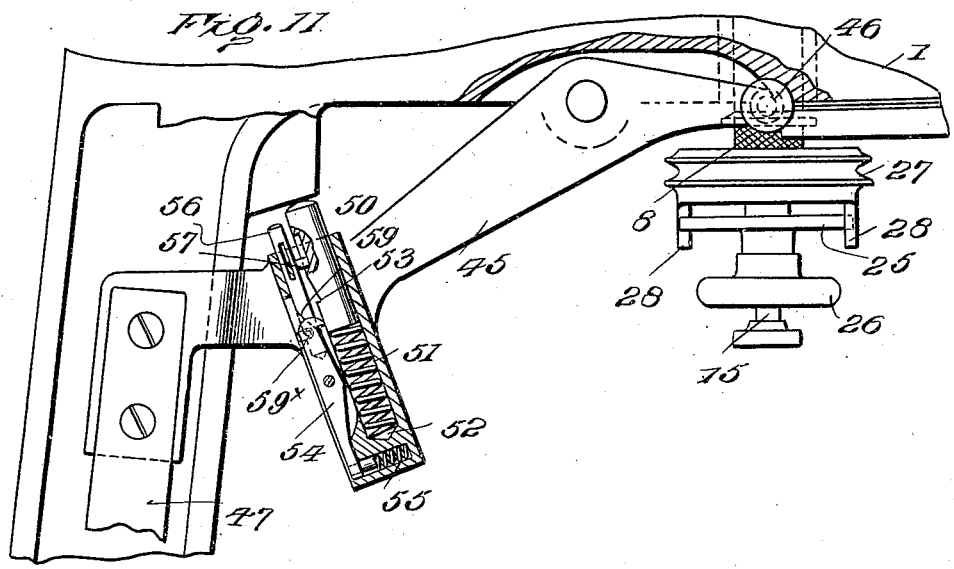
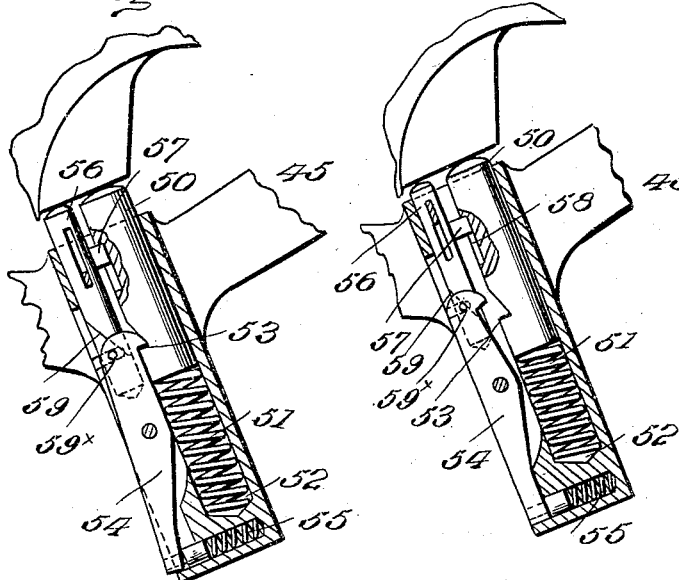
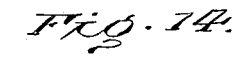
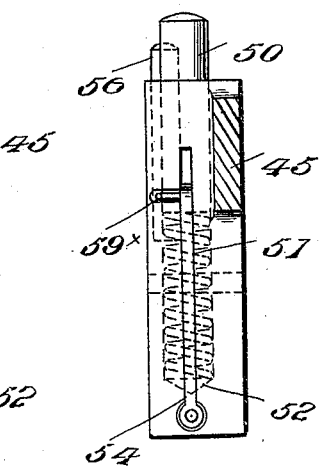

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

CUTTER-HEAD MECHANISM FOR PUNCH-CUTTING AND LIKE MACHINES.

938,433. Specification of Letters Patent. Patented Oct. 26, 1909.

Original application filed July 17, 1906, Serial No. 326,571. Divided and this application filed June 16, 1908. Serial No. 438,832.

*To all whom it may concern:*

Be it known that I, FRANK HINMAN PIERPONT, a citizen of the United States, temporarily residing at Horley, county of Surrey, England, have invented certain new and useful Improvements in Cutter-Head Mechanism for Punch - Cutting and Like Machines; and I do hereby declare the following to be a full, clear, and exact description of the same, reference being had to the accompanying drawings, forming a part of this specification, and to the figures of reference marked thereon.

The present invention relates to means for supporting, adjusting and driving the cutting or milling tools of punch cutting and like machines in general, and is designed more especially for use in connection with or as a component of the punch and matrix cutting machine of application, Serial No. 326,571, filed July 17, 1906, of which this is a division.

Machines of the kind mentioned usually include a revoluble cutter, a blank holder, and a pantograph mechanism, the latter coupled with the work-holder or cutter or both in a manner to effect the relative movements necessary for the production of the desired design or form. When a pattern is employed in connection with the pantograph and the figure to be produced is a copy thereof in one plane, the relative motions of cutter and holder are usually performed in a plane transverse of the axis of the cutter; but if the entire profile is to be reproduced a movement parallel with the axis of the cutter is added.

In punch and matrix cutting the marginal outline of the pattern alone is followed and reproduced at the face of the punch or bottom of the matrix, but beyond those portions the side walls only approximate the pattern, said walls being formed on converging lines with the angles of the pattern gradually merging into curves on lines not present in the pattern but which are determined partly by the shape of the cutter, partly by the successive adjustments of the cutter relative to the blank, and partly by a modification of the action of the pantograph through the interposition of certain followers between the tracing point or stylus and the pattern, as fully disclosed in the before mentioned parent application.

Assuming the pattern to be perfect and the relative adjustments for effecting the gradual reduction or cutting away of the blank to the desired form to be accurately precalculated and registered, it is obvious that if the form of the cutter or the relation of the cutter and blank be otherwise varied, whether by reason of defective workmanship or design in the mechanism, or by expansion and contraction of the parts, a corresponding change in the form or proportions of the resulting product will be effected, hence it has heretofore been customary and in fact necessary to inspect the product and apply corrective adjustments at frequent intervals during the process of cutting each punch, a procedure involving the expenditure of much valuable time, diminishing the output, and militating against uniformity of product.

The cutting mechanism to which the present invention relates is by no means the least important of the constituent elements entering into the construction of such a machine. In practice the cutter is driven at from 5,000 to 6,000 revolutions per minute, and as its axis of rotation and position constitute controlling factors in determining the size, form and position of the character to be produced, it is obvious that anything outside of the precalculated adjustments tending to effect displacement of the cutters must more or less seriously affect the product.

Now the objects of this invention are to eliminate some or all of these disturbing elements, to facilitate the insertion and withdrawal of the cutter, and to provide means for effecting and registering the required adjustments, to which ends the invention consists in the construction, combination and arrangement of parts hereinafter described, the novel features whereof are specified in the claims.

In the accompanying drawings illustrating a preferred form of embodiment: Figure 1 is a front elevation, and Fig. 2 a vertical section of a portion of the frame of a punch cutting machine showing the improved cutter mechanism applied thereto. Fig. 3 is a longitudinal section of the tool holder and its driver. Fig. 4 is a bottom plan of the driver. Figs. 5 5ª and 6 are details of parts of the tool holder. Fig. 7 is a top plan view, and Fig. 8 a side elevation of the holding and adjusting devices for the tool holder. Fig. 9 is a side elevation partly in section of the micrometer for determining the longitudinal position of the cutter. Fig. 10 is a plan of the micrometer screw index. Figs. 11, 12, 13, 14 and 15 are details relating to the cutter shifting lever.

The same numerals designate like parts in the several figures.

Although in many particulars available for use in connection with a machine wherein the pantograph operates upon the cutter carrier, the invention is illustrated as applied to a punch cutting machine wherein the blank holder is coupled with the pantograph and is arranged to move transversely of the cutter, the latter being supported in a bearing formed centrally of the fixed cross piece 1 of the frame, the opening being preferably bushed, as at 2, Fig. 3, to provide a long and true bearing. Within the bearing thus provided is fitted the removable tool holder or "quill", as it is termed, the latter including a shell or sleeve 3, capable of endwise movement in bushing 2, a hollow revoluble spindle 4, and a cutter holder 5. The spindle 4 is supported to rotate within sleeve 3, preferably upon two ball bearings 6, the latter rendered adjustable by sleeve 7, whose position is controlled by a nut 8 threaded upon a reduced portion of the spindle. The cutter 9 (preferably a straight section of wire with a pyramidal point at one end) has its shank fitted to an axial opening or socket 10 in one end of the holder 5, wherein it is confined by screw 11 or other suitable means. Beyond the socket 10 the bore is enlarged to receive a positioning gage 12 and an adjusting screw 13 for gaging the projection of the point of the cutter beyond the end of the holder. The exterior of the upper end of the holder is flared outwardly to form a bearing in the shape of a frustum of a cone, which latter is adapted to accurately and snugly fit a corresponding seat 14 in the end of spindle 4, while the lower end of the holder is threaded to engage an extension piece 15 contained within and projecting beyond the rear end of said spindle. By means of this extension 15 the cutter holder is positioned in the quill under spring pressure, the cone of the holder being seated upon and held in contact with seat 14 in spindle 4 by a spring 16 interposed between a collar 17 on said extension and a shoulder 18 within the spindle. Preferably the tool holder does not engage the bore of the spindle throughout its full length, but is provided with a cylindrical bearing surface 19 projected from the holder at a point remote from the cone, as indicated in Fig. 3.

Suitable means (such as a stud 20 engaging a groove in the holder) is provided to prevent rotation of the holder within the sleeve and at the same time permit a free insertion and withdrawal of the holder, the extension piece 15 being first detached. Thus by unscrewing the extension 15 and pressing the latter up against the action of its spring, the coned head of the holder is raised free of the spindle so as to be readily grasped by the fingers and removed.

A series of holders is provided, each with its tool in position, and as each tool is shaped to exact form while fast in its holder a coincidence of axis and of cutting edges is insured without the necessity of other or further adjustments. A holder can be removed from the spindle and replaced therein, or another holder substituted, without the removal of the spindle from its bearings or the disturbance of a constant relation between the cutting portion of each and any tool with the spindle. The conical head of the cutter holder and the tool held therein are relatively so proportioned and positioned that the base of the cone is not farther from the tip of the tool when secured therein than a radius of the cone base, and as the apex of the cone is directed away from the tip of the cutter the thrust of the latter serves only to bed the cone more perfectly in its bearing in the spindle and thus effectively prevent lateral displacement of the axis. By employing a spring for seating and retaining the holder, distortion of the parts and the incidental displacement of the axis of the cutter, such as occur when positive clamping means, for example, a screw clamp is used, are avoided and each holder is held under precisely similar conditions as to pressure.

To the lower or rear end of the spindle 4 is secured a cross head 25, preferably provided with a hand wheel 26 for manipulating the quill or holder, and between said cross head and bearing 2 is arranged the driving pulley 27 bearing pins 28 which engage the cross head 25, to rotate the spindle.

The pulley is supported upon an open or annular bearing 29, the opening whereof is in axial alinement with the spindle, while its internal diameter equals or slightly exceeds the external diameter of the quill, thus permitting the withdrawal or insertion of the latter in its bearing upon the frame; and to prevent the heat generated by the rapid revolution of the pulley from being communicated to the bearing of the cutter holder and other parts the plate 30 supporting the pulley bearing is insulated from the frame by means of a layer 31 of asbestos or other suitable nonconducting material. By thus providing a separate and remote bearing for the driving pulley and connecting the latter to the spindle through the loose driving connection the spindle is relieved from the strain of the driving belt and is in a manner insulated from the pulley and its bearing.

To protect the joint between the sleeve 3 and spindle 4, there is fitted to the latter a flanged collar 32 extending radially beyond said joint, and further protection against the entrance of chips is afforded by a cap 33 fitted to the collar 32, said cap covering and inclosing the upper end of the quill.

The positioning of the cutter longitudinally of its axis of rotation is effected by devices exterior to the quill and acting upon the sleeve 3 thereof, said devices including an adjustable stop for limiting the advance of the quill in its bearing, to gage the position of the cutter; spring actuated advancing devices; and a spring actuated clamp.

Mounted upon the frame at a point remote from the bearings for the quill and its driving pulley, so as not to be directly influenced by the heat generated there, is a micrometer screw 34 of known construction provided with a graduated drum or disk 35. As organized, one complete turn of the drum is sufficient to effect the limit of adjustment provided for, in consequence of which the drum is provided with a stop 36 engaging a pin 37 carried by an arm secured to the frame for fixing the extreme limits of adjustment in either direction. If desired, the drum may be graduated and the readings taken from a mark on the arm carrying pin 37. The graduations are employed only when special adjustments are required, as it is proposed to eliminate, as far as possible, the personal equation of the operator and substitute therefor automatic means for establishing the precalculated series of adjustments. With these ends in view a disk 38, provided with notches 39 in its periphery, is detachably secured to the end of the micrometer screw, or to drum 35, in position to coöperate with a spring pin 40 carried by the frame, said pin being suitably beveled and operating, by its entrance into a notch, to accurately locate the position of the disk and through the latter the micrometer screw. Each notch is provided with a number or equivalent marking to designate the stage of adjustment corresponding therewith. One of these disks 38 is prepared for each size of punch, and the notches, when engaged with pin 40, indicate the successive positions required to be given to the micrometer screw to rightly position the cutter for the various cuts or stages in shaping the punch.

To enable the operator, while occupying a convenient position for operating the machine, to readily read the markings on the under side of the disk, a mirror 41 is provided, fixed on the standard, the numbers being formed in reverse on the disk so as to appear in normal position on the mirror.

A connection is established between the quill and the micrometer screw 34 through a lever 42, the latter pivotally supported intermediate its ends upon the frame. Opposite ends of the lever are equipped with knife edge or other line or point bearings 43, the one contacting with the end of sleeve 3, and the other with the micrometer screw. One purpose of these knife edge or point bearings is to isolate the micrometer from the heat generating cutter and blank, and from the bearings of the spindle and its driving pulley, in order to prevent their heat from affecting its accuracy.

Preferably, the lever 42 is maintained in contact with sleeve 3, when in position, by the action of a spring 44, the lever partaking of the advancing movements of the quill until arrested by the micrometer screw at the stage indicated by the adjustment of the latter.

The means for advancing the quill, against the resistance of spring 44 and until arrested by the micrometer gage, includes a lever 45, pivotally supported in a slot in cross piece 1 and carrying a longitudinally movable pin 46 extending beneath and engaging the end of sleeve 3. To the opposite end of lever 45 is attached an arm or extension 47 passing down in front of the standard to a point near the base where it is held in frictional contact with a bar 48. The arm is provided with a handle 49 for convenient manipulation. At a point intermediate arm 47 and its pivot lever 45 is provided with a pin 50, abutting against a seat on the frame and controlled by the tension of a spring 51 to cause the lever to normally place upward pressure upon the quill, sufficient in amount to overcome spring 44 and advance the quill until arrested by the micrometer gage, and since it is desirable at times to relieve this advancing pressure a catch is provided for the pin 50, to hold the latter with the spring retracted when the cone is swung out of operative position.

A preferred construction is illustrated wherein the pin 50 and the advancing spring 51 are housed in a recess 52 in lever 45. The pin is provided with a notch 53 to receive the nose of a pivoted catch lever 54, the latter acted upon by a spring 55 tending to effect the engagement of said lever with the pin, the parts being so proportioned as to be in engagement when the arm 47 is retracted to the inoperative position, as in Fig. 12, thus locking the advancing spring 51 in retracted position, thereby relieving the lever from the pressure of the spring and permitting the removal or insertion of the quill in its bearing, the pin 46 being properly manipulated for the purpose.

To release the spring, when it is desired to replace the lever in operative position, a short pin 56 is mounted to move endwise in the recess 52 and provided with a pin 57 engaged in a slot 58 in pin 50. The pin 56 is provided with an incline 59 in position to engage a pin or shoulder 59ˣ on the catch lever 54 for withdrawing the latter from engagement with pin 50. The arrangement is such that when the lever is in operative position, as shown in Figs. 1 and 11, the nose of catch lever 54 rests against pin 50 below the notch 53, and pin 56, by the engagement of its pin 57 with the end of slot 58, is withdrawn from contact with lever 54. Under these conditions pin 50 rests in contact with the frame and advancing spring 51 actuates lever 45 to raise the quill. If, now, the operator desires to release the quill, he moves arm 47 toward the left to a median position marked on bar 48, thereby retracting pin 50 into the position shown in Fig. 12 permitting catch lever 54 to enter the notch 53 in said pin 50 and restrain the latter against the pressure of spring 51.

To again release pin 50 it is only necessary to move arm 47 farther to the left, when pin 56 will be driven in to retract and hold catch lever 54 so that as arm 47 is again moved to the right pin 50 will be projected and its notch 53 carried beyond the catch lever, the latter not being released until by the continued outward movement of pin 50 pin 56 is withdrawn.

The quill is restrained from rotating in its bearing and is maintained in adjusted position by a bolt 60 projected through the bearing 2 and having its inner or engaging end curved to correspond with the exterior of sleeve 3. This bolt 60 is normally held in frictional contact with the quill by spring pressure which is constant and so adjusted as to retain the quill in position without danger of straining or distorting the parts supporting the tool. In the preferred form of embodiment illustrated, a lever 61, pivoted to the cross piece 1, has one end coupled with bolt 60, the other end being engaged on one side by a pin 62 backed up by a spring 62 located within a socket formed in cross piece 1, and on the opposite side by a cam 64 carried by a rod 65, the latter extending to convenient proximity to the operator, where it is equipped with an operating handle.

Having thus described my invention, what I claim as new, and desire to secure by Letters-Patent, is:

1. A cutter-head mechanism for punch cutting and like machines, including, in combination, the following elements, to wit; a hollow spindle adapted to rotate in bearings and provided with a conical seat at one end and an opposed spring actuated plunger; a tool holder provided with a conical head engaging the seat in the spindle, and means for interlocking it with the latter and the plunger and carried thereby; and a cutter secured in the end of the holder with its point remote from the base of the conical seat a distance not greater than a radius of said base.

2. A cutter-head mechanism for punch cutting and like machines, including, in combination, the following elements, to wit; a hollow spindle mounted in bearings and provided with a conical seat at one end and a longitudinally movable spring retracted plunger opposed thereto; a tool holder extending longitudinally within said spindle and provided with a conical head or bearing and means for attachment to said spring retracted plunger; and a cutter secured in said holder.

3. In a cutter-head mechanism for punch cutting and like machines, the combination with a revoluble hollow spindle provided with a conical seat at one end and a spring actuated plunger of a tool holder provided with a conical head or bearing and means for attachment to said plunger.

4. A cutter-head mechanism for punch cutting and like machines, including in combination, the following elements, to wit; a cutter carrying quill comprising an outer sleeve movable longitudinally in a bearing on the frame and provided with a revoluble spindle mounted in bearings within said sleeve and extending beyond one end of the latter; an annular bearing on the frame in axial alinement with said sleeve; an annular driving pulley mounted on said bearings; and means for detachably coupling said pulley and spindle.

5. A cutter-head mechanism for punch cutting and like machines including, in combination, the following elements, to wit; a tool carrying quill comprising a hollow cylindrical shell or sleeve; and a spindle mounted in bearings within said shell and projecting beyond the latter; a cylindrical bearing on the frame within which said quill is removably secured; an annular bearing in axial alinement with said last named bearing and surrounding the extended end of the spindle; an annular driving pulley mounted on said annular bearing; and separable driving devices intermediate said pulley and spindle.

6. A cutter-head mechanism for punch cutting and like machines including, in combination, the following elements, to wit; a cutter carrying quill detachably supported in a bearing and carrying a spindle provided with a cross head; and an annular driving pulley supported upon an open bearing and provided with pins engaging the cross head of the spindle.

7. A cutter-head mechanism for punch cutting and like machines, including, in combination, a quill detachably supported on the frame and provided with a revoluble spindle, and an annular driving pulley supported upon an open bearing, the latter in alinement with said quill.

8. A cutter-head mechanism for punch cutting and like machines including, in combination, the following elements, to wit; a sleeve or shell fitted to move longitudinally within a bearing; a revoluble tubular spindle mounted on bearings on said sleeve; and a tool holder detachably held within said spindle.

9. A cutter-head mechanism for punch cutting and like machines, including, in combination, the following elements, to wit; an annular shell or sleeve fitted to move longitudinally within a relatively fixed bearing; a revoluble tubular spindle supported against longitudinal motion within said sleeve; a cutter holder removably inserted in said hollow spindle; and a spring coupled with said holder and operating to retain the latter upon its seat on the spindle.

10. A cutter-head mechanism for punch cutting and like machines, including, in combination, the following elements, to wit; a cylindrical shell or sleeve adapted to fit and move longitudinally within an inclosing bearing; a tubular spindle supported in bearings within said sleeve and provided with a conical seat at one end, and a longitudinally movable spring-actuated plunger at the other; and a cutter-holder coupled with said plunger and provided with a conical head engaging the seat in the spindle.

11. A cutter-head mechanism for punch cutting and like machines including, in combination, the following elements, to wit; a cylindrical sleeve or shell adapted to move longitudinally within a relatively fixed bearing; a tubular spindle supported upon bearings within said sleeve and provided at one end with a conical seat, the opposite end of said spindle extending beyond the sleeve; a spring retracted plunger located within said sleeve; and a cutter holder extending within the spindle and provided with a conical head fitted to the conical seat therein, said holder being detachably coupled with the spring retracted plunger and the latter operating to retain the conical head in engagement with the seat.

12. A cutter-head mechanism for punch cutting and like machines, including, in combination, the following elements, to wit; a cylindrical sleeve; a tubular spindle revoluble in bearings within said sleeve and extending beyond one end of the latter, said spindle being provided at one end with a conical seat and at the opposite end with a cross-head and an internal spring retracted plunger; a cutter holder coupled with said plunger and provided with a conical head engaging the seat in the spindle; and driving means engaging the cross-head on the spindle to rotate the latter.

13. A cutter-head mechanism for punch cutting and like machines, including, in combination, the following elements, to wit; a hollow sleeve supported to move longitudinally in a relatively fixed bearing; a tubular spindle mounted to rotate within said sleeve and provided with a conical seat, a spring actuated plunger and a cross head; a cutter holder provided with a conical bearing for engaging the seat in the spindle and detachably coupled with said plunger; and a driving pulley mounted on a bearing which is fixed in relation to said sleeve, said pulley provided with pins engaging the cross head on the spindle to rotate the latter and permit longitudinal movement relative to said pulley.

14. A cutter-head mechanism for punch cutting and like machines, including, in combination, the following elements, to wit; a cutter carrying quill longitudinally movable in a relatively fixed bearing on the frame and provided with a sleeve, an internal revoluble spindle, and a tool holder detachably mounted in said spindle; a driver independent of the spindle and connected therewith through an extensible coupling device; and a bearing for said driver mounted upon the frame but insulated therefrom by a nonconducting medium interposed between the bearing and frame.

15. A cutter-head mechanism for punch cutting and like machines, including, in combination, the following elements, to wit; a cutter carrying quill longitudinally movable in a bearing on the frame and provided with a revoluble spindle provided with driving contacts; a driving pulley in tandem with said quill and provided with contact surfaces engaging those of the spindle; and a bearing for said driving pulley supported upon but insulated from the frame.

16. A cutter-head mechanism for punch cutting and like machines, including, in combination, the following elements, to wit; a cutter carrying quill longitudinally movable in a bearing on the frame and provided with a revoluble spindle; a driving pulley coupled with said spindle and mounted on a separate bearing; an elastic pressure device for effecting advance movements of the quill; and a gage for measuring the advance of the quill, said gage located at a point remote from the quill and its driving pulley.

17. A cutter-head mechanism for punch cutting and like machines, including, in combination, the following elements, to wit; a cutter carrying quill movable in a bearing and provided with a revoluble spindle; and a gaging device for determining the advanced position of said quill comprising a micrometer screw located at a distance from the quill and coupled with the latter through a lever.

18. A cutter-head mechanism for punch cutting and like machines, including, in combination, the following elements, to wit; a movable quill provided with a revoluble cutter carrying spindle; means for advancing the quill; and a gaging mechanism for determining the advance of the quill comprising a micrometer screw located at a point remote from the quill and its bearing, a lever interposed between said quill and micrometer screw, and a spring operating to normally preserve contact of the lever with the quill.

19. A cutter-head mechanism for punch cutting and like machines, including, in combination, the following elements, to wit; a movable cutter carrying quill provided with a revoluble spindle; a gaging means including a micrometer screw and a lever, the latter provided with line bearings for engaging the micrometer screw and quill respectively; means for effecting the advance of the quill into engagement with the gaging device, including a spring actuated lever coupled with the quill; and a clamping means for retaining the quill in adjusted position.

20. A cutter-head mechanism for punch cutting and like machines, including a movable cutter-carrying quill provided with a sleeve or casing and a revoluble cutter-carrying spindle and in combination therewith the following elements, to wit; elastic means coupled with the sleeve for advancing the cutter; elastic clamping devices engaging the sleeve to retain the quill in adjusted position; and gaging devices for determining the advance of the quill, the latter including a lever having line contacts with the sleeve and micrometer respectively.

21. A cutter-head mechanism for punch cutting and like machines provided with a movable cutter-carrying quill and adjustable gaging means for determining the advanced position of the quill and in combination therewith spring actuated holding and advancing means.

22. A cutter-head mechanism for punch cutting and like machines, provided with a movable cutter-carrying quill and adjustable means for intercepting the advance of said quill, and in combination therewith a spring actuated advancing means for the quill including a lever coupled with the latter, a spring carried by said lever, a pin interposed between said spring and a fixed bearing, a latch for engaging said pin, to hold the spring when compressed, and a trip for said latch.

23. A cutter-head mechanism for punch cutting and like machines, and in combination with the movable cutter-carrying quill thereof, an adjustable gaging means for controlling the advance of the quill, and an elastic pressure mechanism for advancing the quill, including a lever carrying a spring, a bolt or pin interposed between said spring and a fixed bearing on the frame, a latch engaging said bolt when the spring is compressed, and a trip for said latch in position to be engaged by the frame to release the latch.

24. A cutter-head mechanism for punch cutting and like machines provided with a movable cutter-carrying quill and means for advancing the latter, and in combination therewith, a gaging device for limiting the advance of the quill including a micrometer screw provided with a notched index plate and a coöperating holder, said notches being precalculated to correspond with successive adjustments of the cutter.

FRANK HINMAN PIERPONT.

Witnesses:
H. D. JAMESON,
F. L. RAND.